Aug. 3, 1965
P. W. NIPPERT
3,197,857
METHOD OF PRODUCING CUP-SHAPED CONDUCTIVE
SEMI-CONDUCTOR HOUSING
Filed Dec. 21, 1962
4 Sheets-Sheet 1
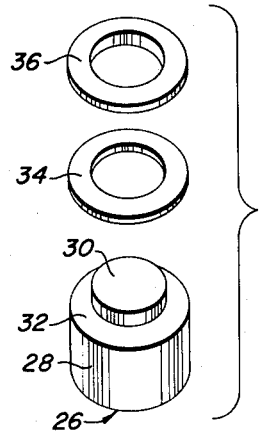
FIG. 1·A
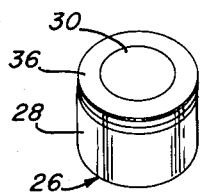
FIG. 1·B
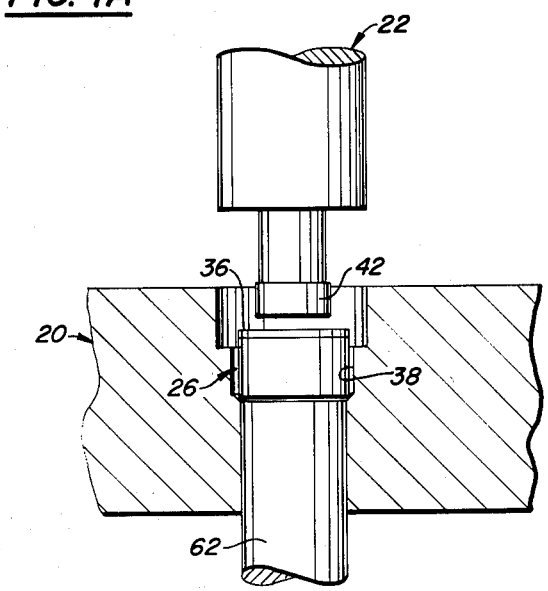
FIG. 1
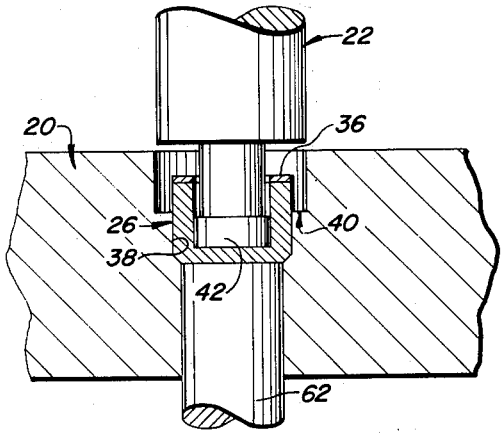
FIG. 2
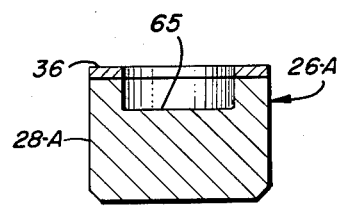
FIG. 1·C
INVENTOR.
PAUL W. NIPPERT
BY *Schmieding and Fultz*
ATTORNEYS Aug. 3, 1965 P. W. NIPPERT 3,197,857
METHOD OF PRODUCING CUP-SHAPED CONDUCTIVE
SEMI-CONDUCTOR HOUSING
Filed Dec. 21, 1962 4 Sheets-Sheet 3

INVENTOR.
PAUL W. NIPPERT
BY
Schmieding and Fultz
ATTORNEYS

INVENTOR.
PAUL W. NIPPERT
BY Schmieding and Fultz
ATTORNEYS

United States Patent Office 3,197,857
Patented Aug. 3, 1965

3,197,857
METHOD OF PRODUCING CUP-SHAPED CONDUC-
TIVE SEMI-CONDUCTOR HOUSING
Paul W. Nippert, Worthington, Ohio, assignor to The
Nippert Electric Products Company, Columbus, Ohio,
a corporation of Ohio
Filed Dec. 21, 1962, Ser. No. 246,496
15 Claims. (Cl. 29—480)

This invention relates to the production of cup-shaped metal articles and particularly to a novel method for producing cup-shaped mounts for semiconductors or the like.

In general, the method of the present invention in one of its aspects comprises forming cupped and rimmed metal articles such as copper mounts for diodes by positioning a cylindrical metal billet in the smaller cavity of a confining die having an inner cavity of smaller diameter and an outer cavity of larger diameter. The billet is next pressurized with a male die means that back-flows metal along the male die member outwardly into the larger outer cavity to work harden and cup the billet and form an unfinished rim portion.

The rim portion thus formed is next pressurized with either a second male die means or with an independently moveable die portion of the previously mentioned first die means to flow metal of said rim portion into conformity with said larger recess and thereby finally shape and further work harden said rim portion.

As another aspect of the present invention, a novel method is provided for fabricating cupped metal mounts for semiconductors of the type which require a weld ring for the subsequent mounting of a cover.

In fabricating composite bimetal semiconductor mounts of this type it has been the practice to form a cup-shaped work piece from a billet of copper or alloy thereof and, subsequent to the cupping, to heat fuse a weld ring to the rim of the work piece. Such heat fusing effected annealing of the work piece, and such annealing resulted in loss of strength of the work piece.

In accordance with the present invention such composite semiconductor mounts are fabricated in accordance with a novel method wherein the weld ring is heat fused to the metal billet prior to the formation of the billet into the cup shaped mount and prior to the final shaping of the rim portion thereof with the result that the finished fused composite mount is finished in a work hardened state to provide a semiconductor mount possessing high and substantially uniform strength throughout all the zones of the shaped article.

As still another aspect of the present invention, the weld ring of the above described composite semiconductor mount is provided with an upstanding weld projection simultaneously with finish shaping of the rim portion of the billet thereby permitting use of a low cost conventional washer shaped blank for producing a weld ring with weld projection of more complex shape.

It is therefore an object of the present invention to provide improved methods for forming rimmed cup-shaped metal articles possessing high and substantially uniform strength characteristics.

It is another object of the present invention to provide an improved method for fabricating mounts for semiconductors of heat fused composite construction which mounts possess superior strength characteristics.

It is still another object of the present invention to provide an improved method for fabricating a mount for a semiconductor of the type that includes a main mount portion and an attached weld ring, said method utilizing a simple washer shaped blank to form a weld ring with a weld projection simultaneously with the formation of the main mount portion.

Further objects and advantages of the present invention will be apparent from the following description, reference being had to the accompanying drawings wherein preferred forms of embodiments of the invention are clearly shown.

In the drawings:

FIG. 1 is a side view, partially in section, of a die means and billet used in practicing one method of the present invention, the section being taken along a vertical plane through the centerline of the die means and billet;

FIG. 1A is an exploded view of the billet disclosed in the die of FIG. 1;

FIG. 1B is an assembled view of the billet of FIG. 1A;

FIG. 1C is a sectional view of a modified billet utilized in practicing a modified method of the present invention;

FIG. 2 is a second side view, partially in section, of the die means of FIG. 1 and showing the operation of a first male die portion of the die means;

Referring in detail to the drawings, FIGS. 1 through 4 illustrate a multiple stage die means and billet for practicing one method of the present invention.

FIGS. 1 and 2 illustrate a female confining die, indicated generally at 20 located at a first station wherein a first male die means, indicated generally at 22, registers with the confining die 20.

Figure 3:
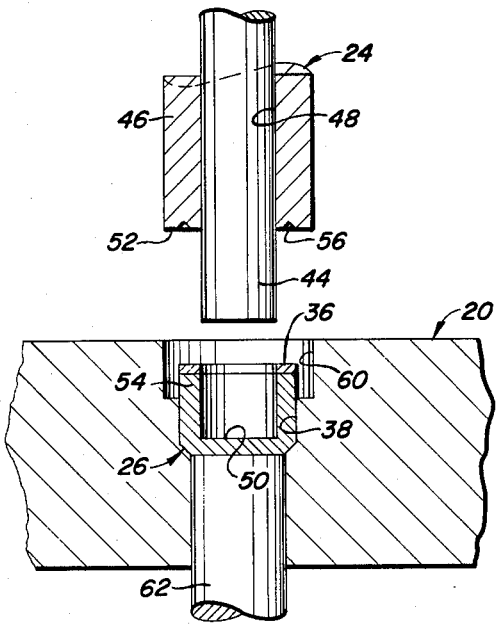
FIGS. 3 and 4 are additional side sectional views of the die means of FIGS. 1 and 2 showing the operation of a second and composite male die portion.
Figure 4:
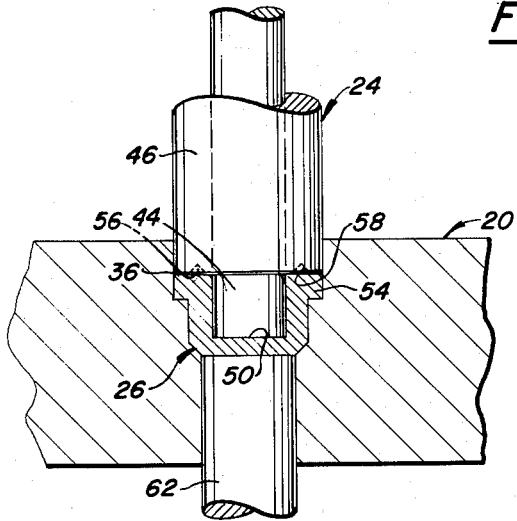

FIGS. 3 and 4 illustrate the same female confining die 20 located at a second station wherein it registers with a second male die means, indicated generally at 24.

It should be pointed out that female confining die 20 can be moved from the first station of FIGS. 1 and 2 to the second station of FIGS. 3 and 4 by mounting the confining die 20 on an index table or other suitable die mounting and shifting means well known to the present art.

Reference is next made to FIG. 1A and FIG. 1B which illustrate a composite billet or work piece, indicated generally at 26, the former showing the components of the billet in exploded relationship and the latter showing the components in assembled relationship.

As is best seen in FIG. 1A, the work piece 26 includes a slug 28 formed of copper, copper alloy or other suitable metal with an integrally formed upwardly extending annular projection 30 surrounded by an annular weld ring supporting surface 32.

Slug 28 is preferably formed by heading wire stock formed of copper, copper alloy or other suitable metal.

Copper zirconium alloy of the type disclosed in my United States Letters Patent No. 2,879,191, filed June 23, 1958 is particularly suitable for the purpose due to the characteristics of the alloy set forth in detail in said patent.

The composite work piece 26 is formed by first positioning a braze ring 34 on supporting surface 32 and next positioning a weld ring 36 on top of the braze ring.

It should be pointed out that the weld ring 36 is in the form of a simple flat washer configuration.

After the braze ring and weld ring are assembled on slug 28 in surrounding relationship with annular projection 30, as seen in FIG. 1B, the assembly is heat fused, preferably in a furnace that provides a reducing atmosphere of hydrogen gas.

After the composite work piece 26 of FIG. 1B is fused, it is placed in a smaller inner cavity 38 of confining die 20, as seen in FIG. 1.

Pressure is next applied to work piece 26 by downwardly advancing solid male die portion 22 against the work piece to cause a back-flow of billet metal in the direction of arrow 40 and along the outer surface of a tip portion 42 of male punch means 22.

The solid male punch means 42 is next withdrawn from its bottomed position of FIG. 2 in the female confining die 20 and the die is moved to the second station wherein it registers with a second and compound male die means 24, FIG. 3, that includes a central male die portion, 44 and an outer annular male die portion 46, the latter being slidable along the former at the sliding surfaces formed by the bore 48 in outer male die portion 46 in the outer surfaces of inner male die portion 44.

With the cup-shaped work piece 26 positioned in the inner smaller cavity 38 of the confining die, as seen in FIG. 3, the compound male die portion 24 is advanced to a position wherein tip portion 44 applies pressure to a bottom inner surface 50 of the work piece and thereby firmly retains the work piece in position.

The outer male die portion 46, FIGS. 3 and 4, is next pressurized, by a separate power means to cause a lower surface 52 thereon to engage the upper surface of weld ring 36 and thereby apply pressure to the weld ring and an unshaped rim portion 54 of the work piece.

The pressurized outer male die portion 46 is advanced to its bottomed position shown in FIG. 4 wherein the rim portion 54 of the work piece has been deformed radially outwardly to its finished configuration.

In the configuration of FIG. 4 additional pressure is applied to the outer male die portion 46 whereby metal from weld ring 36 is displaced upwardly into an annular cavity 56 provided in the lower surface 52 of the outer male die portion. This forms a weld projection 58 on weld ring 36 seen in enlarged relationship in the assembly view of FIG. 8.

Figure 5:
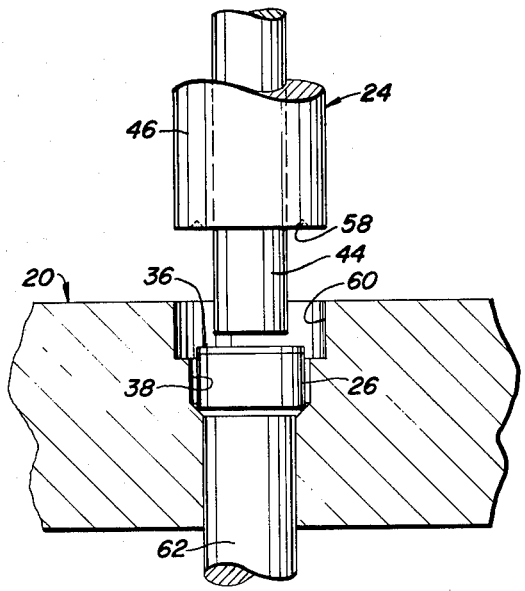
FIG. 5 is a side view, partially in section, showing a second die means and billet and utilized in practicing a second method of the present invention, said second die means including a compound male die portion.
Figure 6:
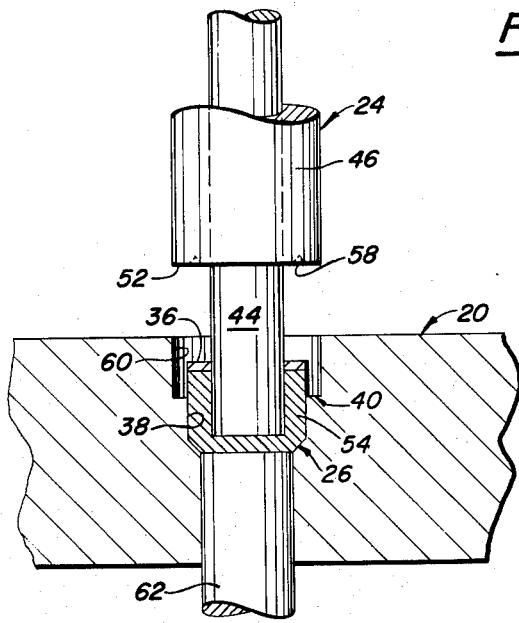
FIGS. 6 and 7 are additional partially sectional views, corresponding to FIG. 5, and showing the second die means and billet thereof.
Figure 7:
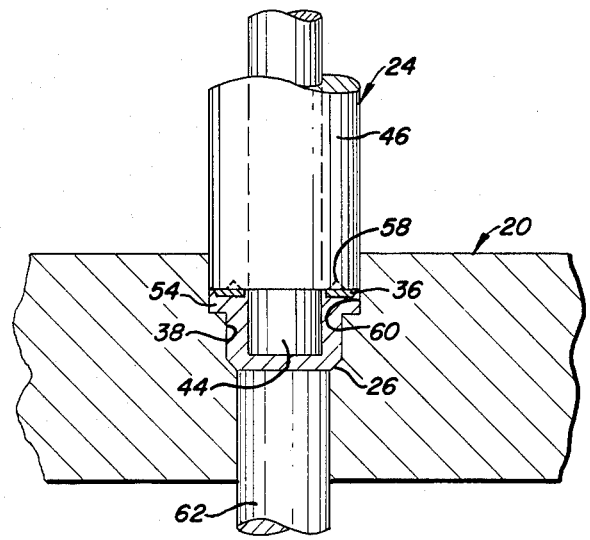

Reference is next made to FIGS. 5 through 7 which illustrate a second die means for practicing a modified method of the present invention wherein the entire billet forming operation is formed at a simple work station that includes a female confining die 20, identical to the one previously described and a compound male die means 24 that includes the previously described central male die portion 44 and outer male die portion 46.

As seen in FIG. 5, the assembled and heat fused composite work piece 26, as seen in FIG. 1B, is positioned in the inner smaller cavity 38 of confining die 20 and central punch position 44 is pressurized and forced downwardly to the position of FIG. 6, whereby metal is caused to back-flow upwardly in the direction of arrow 40 whereby the work piece is cupped.

Figure 8:
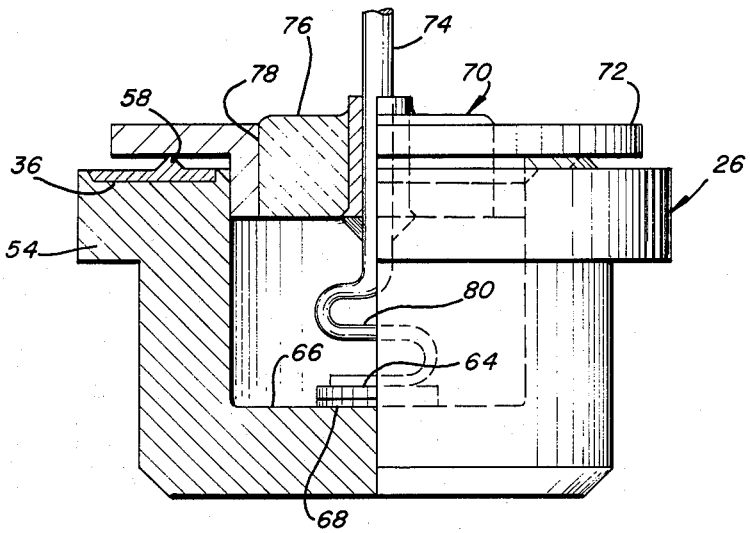
FIG. 8 is a side elevational view, partially in section, showing a semiconductor assembled on a composite semiconductor mount constructed in accordance with the present invention.

Outer male die portion 46 is next pressurized and moved downwardly to the position of FIG. 7 whereby the rim portion 54 of work piece 26 is upset outwardly against the side wall of outer larger cavity 60 whereby rim portion 54 of the work piece is formed to its finished shape, seen in FIG. 8.

It should be pointed out that when outer male die portion 46 is advanced from the position of FIG. 6 to the position of FIG. 7, central die portion 44 is maintained pressurized to hold the cupped work piece accurately positioned during the upsetting of rim portion 54.

It should be pointed out female confining die 20 includes an ejector pin 62 operated by suitable power means which, when actuated, ejects the cupped and rimmed work piece from the mount.

It will be noted that the lower surface 52 of outer male die portion 46, FIGS. 5 through 7, is also provided with an annular groove 56, if desired, which serves to receive a pressurized flow of metal from weld ring 36 when outer male die portion 46 is pressurized.

Reference is next made to FIG. 8 which shows a finished semiconductor mount in associated assembly that includes a previously described cup shape mount 26 with the flared rim portion 54 that supports the weld ring 36.

The semiconductor 64 is secured to the inner bottom surface 66 of the mount by soft solder or other suitable fusing material indicated at 68.

The cup shape mount is provided with a cover indicated generally at 70 that is preferably formed of the same metal as weld ring 36, said cover including a peripheral flange 72 of substantially the same thickness as the underlying weld ring 36. When peripheral flange 72 is welded to weld ring 36, the upstanding weld projection 58 on the ring is melted and merges with the fused junction.

Contact with the semiconductor is obtained by a conducting element 74 that extends through a dielectric disk 76 mounted in a hole 78 in the center of cover 70.

A thin yieldable strip 80, formed of conducting material, is interposed between the lower end of conductor element 74 and the mounted semiconductor 64.

The mount of the present invention can be produced at lower die stresses by utilizing a modified composite work piece 26–A that includes a recess 65 formed in the copper alloy billet when it is cold headed or otherwise formed and prior to the mounting and fusing of braze ring 34 and weld ring 36. When such modified work piece 26–A is positioned in the confining die 20 and the male die member 22 or 24 is pressurized the recess 65 of modified work piece 26–A serves to help guide the male die portion and also reduces the amount of slug metal that must be displaced, the latter serving to lower the required press pressures as well as the stresses imposed on the die components.

While the forms of embodiments of the present invention as herein disclosed constitute preferred forms, it is to be understood that other forms might be adopted, all coming within the scope of the claims which follow.

I claim:

1. The steps in the method of forming a cupped and rimmed metal part which method comprises positioning a metal billet in a confining die having an inner recess of smaller diameter and an outer recess of larger diameter; applying pressure to the top and bottom surfaces of the central portion of said billet with a male die means while the bottom surface of the billet is held stationary to back-flow metal of said billet from said smaller recess to said larger recess and thereby cup and work harden said billet and form thereon an inner bottom surface and an annular rim portion; and applying pressure next to said rim portion, while maintaining pressure within the cup, to flow metal of said rim portion into conformity with said larger recess and thereby shape and further work harden said rim portion.

2. The steps in the method of forming a cupped mount for a semiconductor which method comprises forming a metal billet that includes a bottom surface and top portion provided with an upstanding annular projection surrounded by an annular weld ring supporting surface; locating a metal weld ring on said supporting surface in surrounding relationship with said annular projection; fusing said weld ring to said surface to form a composite work piece; positioning said work piece in a confining die; and applying pressure to said composite work piece centrally of said annular projection with a male die means while the bottom surface of the billet is held stationary to cup and work harden said composite work piece.

3. The steps in the method of forming a cupped mount for a semiconductor which method comprises forming a metal billet that includes a bottom surface and top portion provided with an upstanding annular projection surrounded by an annular weld ring supporting surface; locating a ring of fusing material on said supporting surface; locating a metal weld ring on said ring of fusing material to form a composite work piece; heating said work piece to fuse said weld ring to the top portion of said billet; positioning said work piece in a confining die; and applying pressure to said composite work piece centrally of said annular projection with a male die means while the bottom surface of the billet is held stationary to cup and work harden said composite work piece.

4. The steps in the method of forming a cupped and rimmed mount for a semiconductor which method comprises forming a metal billet that includes a bottom surface and top portion provided with an upstanding annular projection surrounded by an annular weld ring supporting surface; locating a metal weld ring on said supporting surface in surrounding relationship with said annular projection; fusing said weld ring to said surface to form a composite work piece; positioning said composite work piece in a confining die having an inner recess of smaller diameter and an outer recess of larger diameter; applying pressure to said billet centrally of said annular projection with a male die means while the bottom surface of the billet is held stationary to back-flow metal of said billet from said smaller recess to said larger recess and thereby cup and work harden said billet and form thereon an inner bottom surface and an annular rim portion supporting said weld ring; and applying pressure next to said weld ring and rim portion, while maintaining pressure within the cup, to flow metal of said rim portion into conformity with said larger recess and thereby shape and further work harden said rim portion.

5. The steps in the method of forming a cupped and rimmed mount for a semiconductor which method comprises forming a metal billet that includes a bottom surface and top portion provided with an upstanding annular projection surrounded by an annular weld ring supporting surface; locating a ring of fusing material on said supporting surface; locating a metal weld ring on said ring of fusing material to form a composite work piece; heating said work piece to fuse said weld ring to the top portion of said billet; positioning said composite work piece in a confining die having an inner recess of smaller diameter and an outer recess of larger diameter; applying pressure to said billet centrally of said annular projection with a male die means while the bottom surface of the billet is held stationary to back-flow metal of said billet from said smaller recess to said larger recess and thereby cup and work harden said billet and form thereon an inner bottom surface and an annular rim portion supporting said weld ring; and applying pressure next to said weld ring and rim portion, while maintaining pressure within the cup, to flow metal of said rim portion into conformity with said larger recess and thereby shape and further work harden said rim portion.

6. The steps in the method of forming a cupped and rimmed metal part which method comprises positioning a metal billet in a confining die having an inner recess of smaller diameter and an outer recess of larger diameter; applying pressure to said billet with a compound male die means having a central male die portion and a peripheral die portion, said pressure being first applied to the top central portion of said billet with said central male die portion while the bottom surface of the billet is held stationary to back-flow metal of said billet from said smaller recess to said larger recess and thereby cup and work harden said billet and form thereon an inner bottom surface and an annular rim portion; and applying pressure to said annular rim portion of said billet with said peripheral die portion, while applying pressure to said inner bottom surface with said central male die portion, to flow metal of said rim portion into conformity with said larger recess and thereby shape and further work harden said rim portion.

7. The steps in the method of forming a cupped and rimmed mount for a semiconductor which method comprises forming a metal billet that includes a top portion provided with an upstanding annular projection surrounded by an annular weld ring supporting surface; locating a metal weld ring on said supporting surface in surrounding relationship with said annular projection; fusing said weld ring to said surface to form a composite work piece; positioning said composite work piece in a confining die having an inner recess of smaller diameter and an outer recess of larger diameter; applying pressure to said billet with a compound male die means having a central male die portion and a peripheral die portion, said pressure being first applied centrally of said annular projection with said central male die portion while the bottom surface of the billet is held stationary to back-flow metal of said billet from said smaller recess to said larger recess and thereby cup and work harden said billet and form thereon an inner bottom surface and an annular rim portion supporting said weld ring; and applying pressure to said weld ring and rim portion with said peripheral die portion, while applying pressure to said inner bottom surface with said central male die portion, to flow metal of said rim portion into conformity with said larger recess and thereby shape and further work harden said rim portion.

8. The steps in the method of forming a cupped and rimmed mount for a semiconductor which method comprises forming a metal billet that includes a top portion provided with an upstanding annular projection surrounded by an annular weld ring supporting surface; locating a ring of fusing material on said supporting surface; locating a metal weld ring on said ring of fusing material to form a composite work piece; heating said work piece to fuse said weld ring to the top portion of said billet; positioning said composite work piece in a confining die having an inner recess of smaller diameter and an outer recess of larger dimeter; applying pressure to said billet with a compound male die means having a central male die portion and a peripheral die portion, said pressure being first applied centrally of said annular projection with said central male die portion while the bottom surface of the billet is held stationary to back-flow metal of said billet from said smaller recess to said larger recess and thereby cup and work harden said billet and form thereon an inner bottom surface and an annular rim portion supporting said weld ring; and applying pressure to said weld ring and rim portion with said peripheral die portion, while applying pressure to said inner bottom surface with said central male die portion, to flow metal of said rim portion into conformity with said larger recess and thereby shape and further work harden said rim portion.

9. The method defined in claim 1 wherein said central portion of said billet is provided with a recess prior to application of pressure to said billet with said male die means.

10. The steps in the method of forming a cup-shaped mount having a metal weld ring on the top surface thereof, which steps comprise:
 (A) Forming a metal billet having a top surface and a bottom surface;
 (B) fusing a metal weld element to said top surface to form a composite work piece;
 (C) positioning said work piece in a confining die with the top surface exposed;
 (D) and applying pressure to the top surface of the composite work piece by a male die while the bottom surface is held stationary to cup and work harden the composite work piece.

11. The steps in the method as defined in claim 10, characterized in that the top surface of the billet is provided with an upstanding projection surrounded by a weld ring supporting surface, and that the metal weld element is in the form of a ring which is fused to the aforesaid surface.

12. The steps in the method as defined in claim 10, characterized in htat the top surface of the billet is provided with a recess surrounded by a weld ring supporting surface, and that the metal weld element is in the form of a ring which is fused to the aforesaid supporting surface.

13. The steps in the method of forming a cup-shaped mount having a welding ring on the top surface thereof, which comprise:
   (A) Forming a metal billet having a top surface and a bottom surface;
   (B) fusing a metal weld element to said top surface to form a composite work piece;
   (C) positioning said work piece, with the top surface thereof exposed, in a confining die having a lower recess, and an upper recess of larger diameter than the lower recess; applying pressure to the top surface of said work piece with a male die while the bottom surface is held stationary to back-flow metal of the billet from said smaller recess to said larger recess, and thereby cup and work harden said billet to form a cup-shaped mount having a rim and weld element on the rim;
   (D) and then shaping the rim in conformity with the larger recess and further work harden the rim by applying pressure to the rim while in said die and while maintaining pressure within the cup.

14. The steps in the method as defined in claim 13, characterized in that the top surface of the billet is provided with an upstanding projection surrounded by a weld ring supporting surface and that the metal weld element is in the form of a ring which is fused to the aforesaid supporting surface.

15. The steps in the method as defined in claim 13, characterized in that the top surface of the billet is provided with a recess surrounded by a weld ring supporting surface, and that the metal weld element is in the form of a ring which is fused to the aforesaid supporting surface.

References Cited by the Examiner

UNITED STATES PATENTS

| | | | |
|---|---|---|---|
| 2,028,996 | 1/36 | Sautier | 29—535 |
| 2,314,105 | 3/43 | Rose | 29—155.5 |
| 2,471,663 | 5/49 | Tietz | 29—480 |
| 3,020,454 | 2/62 | Dixon | 317—234 |
| 3,050,849 | 8/62 | Etchison | 29—534 |
| 3,119,052 | 1/64 | Tsuji | 317—234 |

FOREIGN PATENTS 874,514   8/61   Great Britain.

JOHN F. CAMPBELL, *Primary Examiner.*